US009640825B2

(12) United States Patent
Miura et al.

(10) Patent No.: US 9,640,825 B2
(45) Date of Patent: May 2, 2017

(54) FUEL CELL (71) Applicant: NGK INSULATORS, LTD., Nagoya-shi, Aichi (JP)

(72) Inventors: Yohei Miura, Nagoya (JP); Makoto Ohmori, Nagoya (JP); Ayano Kobayashi, Nagoya (JP); Takafumi Terahai, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 14/661,402

(22) Filed: Mar. 18, 2015

(65) Prior Publication Data
US 2015/0194692 A1    Jul. 9, 2015

Related U.S. Application Data (63) Continuation of application No. 13/870,442, filed on Apr. 25, 2013, now Pat. No. 9,017,898, which is a continuation of application No. PCT/JP2012/075965, filed on Oct. 5, 2012.

(30) Foreign Application Priority Data

Oct. 14, 2011   (JP) ................................ 2011-277418
Jun. 18, 2012   (JP) ................................ 2012-136509
Jul. 17, 2012   (JP) ................................ 2012-158576
Sep. 6, 2012    (JP) ................................ 2012-196183
Sep. 27, 2012   (JP) ................................ 2012-214868

(51) Int. Cl.
*H01M 8/12*     (2016.01)
*H01M 8/1213*   (2016.01)
*H01M 8/1004*   (2016.01)
*H01M 8/1253*   (2016.01)
*H01M 4/86*     (2006.01)
*H01M 4/90*     (2006.01)
*H01M 8/124*    (2016.01)

(52) U.S. Cl.
CPC ....... *H01M 8/1213* (2013.01); *H01M 4/8605* (2013.01); *H01M 4/8621* (2013.01); *H01M 4/8663* (2013.01); *H01M 4/9066* (2013.01); *H01M 8/1004* (2013.01); *H01M 8/1253* (2013.01); *H01M 2008/1293* (2013.01); *H01M 2300/0077* (2013.01); *Y02E 60/521* (2013.01); *Y02E 60/525* (2013.01); *Y02P 70/56* (2015.11)

(58) Field of Classification Search
CPC ............. H01M 8/1004; H01M 4/8605; H01M 8/1213; H01M 8/1253
See application file for complete search history.

(56) References Cited

U.S. PATENT DOCUMENTS

| | | | |
|---|---|---|---|
| 6,692,855 B1* | 2/2004 | Aizawa et al. | 429/479 |
| 2002/0048701 A1 | 4/2002 | Ukai et al. | |
| 2002/0127351 A1* | 9/2002 | Takikawa et al. | 427/569 |
| 2004/0197628 A1 | 10/2004 | Yoshikata et al. | |
| 2005/0112453 A1 | 5/2005 | Song et al. | |
| 2005/0244693 A1 | 11/2005 | Strutt et al. | |
| 2008/0087869 A1† | 4/2008 | Ehrman | |
| 2008/0124598 A1* | 5/2008 | Backhaus-Ricoult et al. | 429/27 |
| 2008/0124613 A1 | 5/2008 | Gur et al. | |
| 2012/0237849 A1* | 9/2012 | Kobayashi et al. | 429/480 |

FOREIGN PATENT DOCUMENTS

| | | |
|---|---|---|
| JP | 01-227362 A | 9/1989 |
| JP | 09-092302 A | 4/1997 |
| JP | 09-129245 A | 5/1997 |
| JP | 10-021935 A | 1/1998 |
| JP | 2000-030728 A | 1/2000 |
| JP | 2002-134131 A | 5/2002 |
| JP | 2004-207233 A | 7/2004 |
| JP | 2005-158436 A | 6/2005 |
| JP | 2005-166481 A | 6/2005 |
| JP | 2006-032132 A | 2/2006 |
| JP | 2007-103077 A | 4/2007 |
| JP | 2009-259568 A | 11/2009 |
| JP | 2010-511282 A | 4/2010 |
| JP | 2010-210420 A | 9/2010 |
| WO | 2008/121128 A2 | 10/2008 |

OTHER PUBLICATIONS

The Extended European Search Report for the corresponding European patent application No. 12840303.7 issued on Oct. 1, 2015.
Thyden et al., "Microstructural characterization of SOFC Ni—YSZ anode composites by low-voltage scanning electron microscopy", Mar. 1, 2008, vol. 178, No. 39-40, pp. 1984-1989, Solid State Ionics, North Holland Pub. Company, Amsterdam, NL.
The Extended European Search Report for the divisional application No. 16169377.5 of the corresponding European application issued on Nov. 21, 2016.
Cronin et al., "Impact of pore microstructure evolution on polarization resistance of Ni-Yttria-stabilized zirconia fuel cell anodes", Journal of Power Sources, Mar. 1, 2011, vol. 196 No. 5, pp. 2640-2643, Elsevier, Netherlands.

(Continued)

*Primary Examiner* — Muhammad Siddiquee
(74) *Attorney, Agent, or Firm* — Global IP Counselors, LLP (57) ABSTRACT

A fuel cell includes an anode, a solid electrolyte layer, a barrier layer, and a cathode. The anode includes a transition metal and an oxygen ion conductive material. In the interface region within 3 micrometers from the interface with the solid electrolyte layer of the anode after reduction, the content rate of silicon is less than or equal to 200 ppm, the content rate of phosphorous is less than or equal to 50 ppm, the content rate of chromium is less than or equal to 100 ppm, the content rate of boron is less than or equal to 100 ppm, and the content rate of sulfur is less than or equal to 100 ppm.

5 Claims, 5 Drawing Sheets (56) References Cited

OTHER PUBLICATIONS

Sasaki et al., "Impurity Poisoning of SOFCs", ECS Transactions, Jan. 1, 2011, vol. 35 No. 1, pp. 2805-2814, The Electrochemical Society, U.S.

Sasaki et al., "Chemical durability of Solid Oxide Fuel Cells: Influence of impurities on long-term performance", Journal of Power Sources, Sep. 10, 2010, vol. 196 No. 22, pp. 9130-9140, Elsevier, Netherlands.

Cho et al., "Fabrication and characterization of Ni-supported solid oxide fuel cell", Solid State Ionics, Jun. 22, 2009, vol. 180 No. 11-13, pp. 792-795, Elsevier, Netherlands.

Lee, et al., "Effect of N-Gd0.1Ce0.9O1.95 Anode Functional Layer Composition on Performance of Lower Temperature SOFCs," Journal of The Electrochemical Society, 159(7), pp. F187 to F193 (Published Jul. 17, 2012) (Presented at the Vancouver, Canada, Meeting of the Society, Apr. 25-30, 2010).†

D. Waldbillig, et al., "Enhancing the Redox Tolerance of Anode-Supported SOFC by Microstructural Modification," Journal of The Electrochemical Society, 154(2), pp. B133-B138 (2007).†

T. Horita, et al., "Effects of Impurities on the Degradation of SOFC Stacks," ECS Transactions, 26(1), pp. 349 to 356 (2010).†

T. Horita, et al., "Effects of Impurities on the Degradation of SOFC Stacks," National Institute of Advanced Industrial Science and Technology, pp. 1 to 28 (Nov. 2009).†

Jiangrong, et al., "Anode-Supported IT-SOFC anode Prepared by Tape Casting Technique," The 1st International Forum on Strategic Technology e-Vehicle IFOST 2006, pp. 186 to 189 (Oct. 18-20, 2006).†

\* cited by examiner
† cited by third party

FUEL CELL

CROSS REFERENCE TO RELATED APPLICATIONS

This application is a continuation of application Ser. No. 13/870,442, filed Apr. 25, 2013, and entitled "Fuel Cell", which is a continuation of PCT/JP2012/075965, filed Oct. 5, 2012, which claims priority to JP 2011-27718, filed Oct. 14, 2011, JP 2012-136509, filed Jun. 18, 2012, JP 2012-196183, filed Sep. 6, 2012, and JP 2012-214868, filed Sep. 27, 2012, the entire contents of each of which are hereby incorporated by reference.

TECHNICAL FIELD

The present invention relates to a solid-oxide fuel cell.

BACKGROUND ART

A solid-oxide fuel cell generally includes an anode, a cathode and a solid electrolyte layer that is disposed between the anode and the cathode. The anode generally contains a transition metal such as nickel or the like and an oxygen ion conductive material such as yttria-stabilized zirconia or the like (for example, reference is made to Japanese Patent Application Laid-Open No. 2006-32132).

SUMMARY

Technical Problem

However, since the output of the fuel cell disclosed in Japanese Patent Application Laid-Open No. 2006-32132 exhibits a tendency to decrease, there is a need for an improvement in relation to maintenance of the output of the fuel cell.

The present invention is conceived in light of the above situation, and it is an object thereof to provide a fuel cell in which a decrease in output can be suppressed.

Solution to Problem

A fuel cell according to a first aspect of the present invention comprises an anode, a cathode, and a solid electrolyte layer that is disposed between the anode and the cathode. The anode after reduction has an interface region within 3 micrometers from the interface between the solid electrolyte layer and the anode. In the interface region, a content rate of silicon is less than or equal to 200 ppm, a content rate of phosphorus is less than or equal to 50 ppm, a content rate of chrome is less than or equal to 100 ppm, a content rate of boron is less than or equal to 100 ppm, and a content rate of sulfur is less than or equal to 100 ppm.

A fuel cell according to a second aspect of the present invention comprises an anode, a cathode, and a solid electrolyte layer that is disposed between the anode and the cathode. The anode includes nickel and an oxygen ion conductive material. In a cross section of the anode, the anode has a region in which an average value of a contact length of a particle of nickel and a particle of the oxygen ion conductive material is greater than or equal to 0.4 micrometers and less than or equal to 0.9 micrometers.

Advantageous Effects

The present invention provides a fuel cell in which a decrease in output can be suppressed.

DESCRIPTION OF EMBODIMENTS

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, a solid oxide fuel cell (SOFC) will be described as an example of a fuel cell battery. In the following description, although a so-called flat-tubular type fuel cell battery is described, the invention is not limited in this regard, and may be applied to a so-called segmented-in-series fuel cell battery Configuration of Fuel Cell 10

Figure 1:
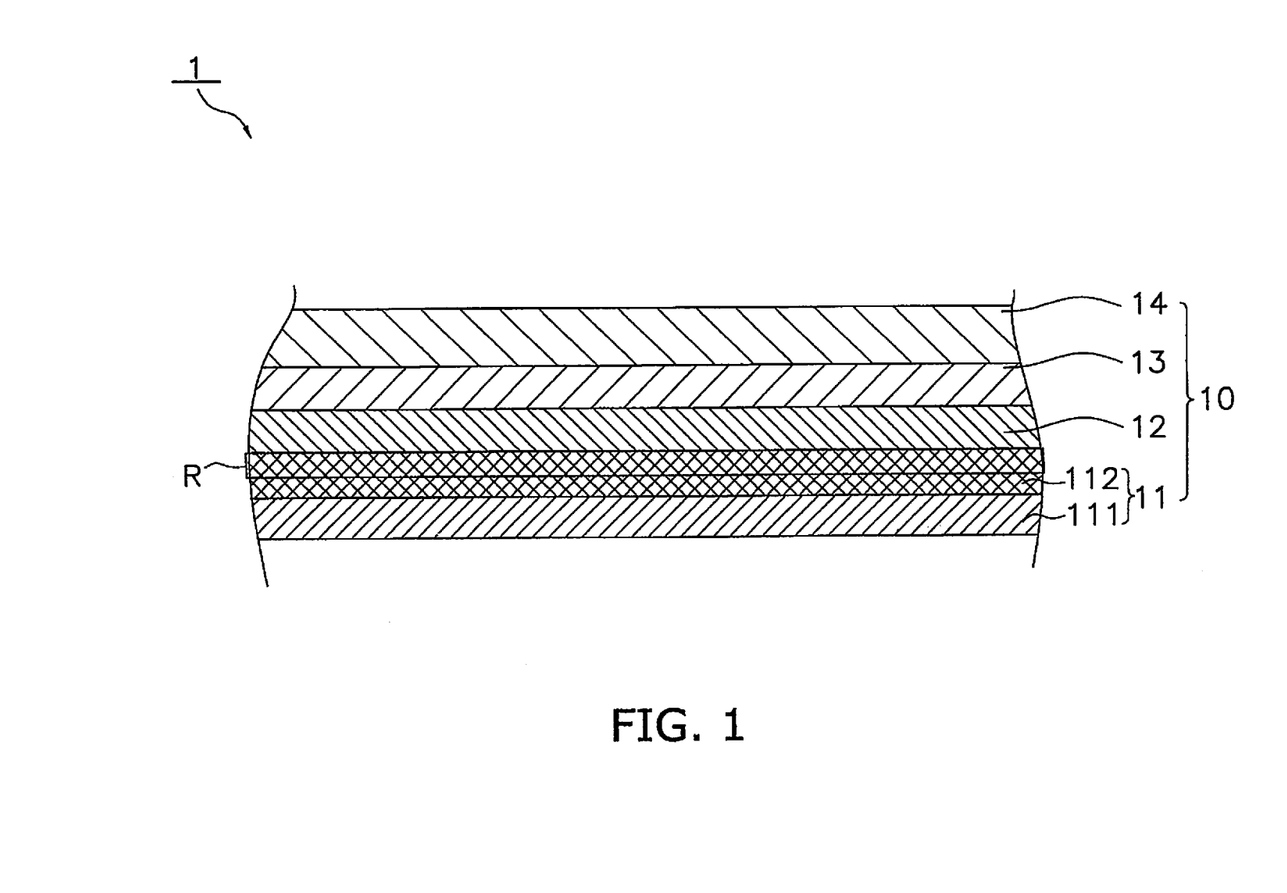
FIG. 1 is a sectional view illustrating the configuration of a fuel cell.

The configuration of a fuel cell (abbreviated below to "cell") 10 will be described making reference to the figures. FIG. 1 is a sectional view of the configuration of the cell 10.

The cell 10 is a thin tabular body composed of a ceramic material. The thickness of the cell 10 may be for example 300 micrometers to 3 mm, and the diameter of the cell 10 may be 5 mm to 50 mm. A plurality of cells 10 is connected in series by an interconnector to form a fuel cell battery.

The cell 10 includes an anode 11, a solid electrolyte layer 12, a barrier layer 13 and a cathode 14.

The anode 11 functions as an anode of the cell 10. The anode 11 as illustrated in FIG. 1 is configured from an anode current collecting layer 111 and an anode active layer 112. In the present embodiment, although the anode 11 is assumed to be in a reduced state, the content rate (ppm) of each composition that configures the anode 11 is approximately fixed before and after reduction.

The anode current collecting layer 111 is a porous tabular fired body including a transition metal and an oxygen ion conductive material. The anode current collecting layer 111 includes nickel oxide (NiO) and/or nickel (Ni) as the transition metal. The oxygen ion conductive material in the anode current collecting layer 111 may include a zirconia-based material such as scandia-stabilized zirconia (ScSZ) and yttria-stabilized zirconia (8YSZ, 10YSZ, or the like), or a ceria-based material such as gadolinium doped ceria (GDC (Ce,Gd)O$_2$) and samarium doped ceria (SDC ((Ce, Sm)O$_2$), or yttria (Y$_2$O$_3$).

The thickness of the anode current collecting layer 111 may be 0.2 mm to 5.0 mm. The thickness of the anode current collecting layer 111 may be the largest of each constituent member of the cell 10 when functioning as a base plate. The volume ratio of Ni and/or NiO in the anode current collecting layer 111 may be 35 to 65 volume % using an Ni conversion, and the volume ratio of the oxygen ion conductive material may be 35 to 65 volume %.

The anode active layer 112 is disposed between the anode current collecting layer 111 and the solid electrolyte layer 12. The anode active layer 112 is a porous tabular fired body including a transition metal and an oxygen ion conductive material. The anode active layer 112 includes at least NiO and/or Ni as the transition metal. The transition metal used in the anode active layer 112 may further include Fe$_2$O$_3$ (or FeO) and/or CuO and/or Cu. The oxygen ion conductive material in the anode active layer 112 may include a zirconia-based material such as yttria-stabilized zirconia (8YSZ, 10YSZ, or the like) and scandia-stabilized zirconia (ScSZ), or a ceria-based material such as gadolinium doped ceria (GDC (Ce,Gd)O$_2$) and samarium doped ceria (SDC ((Ce, Sm)O$_2$).

The thickness of the anode active layer 112 may be 1.0 micrometers to 30.0 micrometers. The volume ratio of Ni and/or NiO in the anode active layer 112 may be 25 to 50 volume % using an Ni conversion, and the volume ratio of the oxygen ion conductive material may be 50 to 75 volume %. In this manner, the content ratio of the oxygen ion conductive material in the anode active layer 112 may be greater than in the anode current collecting layer 111.

In a region of the anode 11 that is within 3 micrometers from the interface Q between the solid electrolyte layer 12 and the anode 11 (hereinafter referred to as "interface region R"), the content rate of silicon (Si) is less than or equal to 200 ppm, the content rate of phosphorus (P) is less than or equal to 50 ppm, the content rate of chrome (Cr) is less than or equal to 100 ppm, the content rate of boron (B) is less than or equal to 100 ppm, and the content rate of sulfur (S) is less than or equal to 100 ppm. In particular, in the interface region R of the anode 11, it is preferred that the content rate of Si is less than or equal to 100 ppm, the content rate of P is less than or equal to 30 ppm, the content rate of Cr is less than or equal to 50 ppm, the content rate of B is less than or equal to 50 ppm, and the content rate of S is less than or equal to 30 ppm. Furthermore, in the interface region R of the anode 11, it is preferred that the content rate of Si, P, Cr, B and S is greater than or equal to 1 ppm. The respective content rates of Si, P, Cr, B and S in the interface region R for example may be measured using secondary ion-microprobe mass spectrometry.

The respective amounts of Si, P, Cr, B and S contained in the reduced anode 11 may be present in an inner portion of the transition metal particles, or in the particle interface between transition metal particles.

As illustrated in FIG. 1, although the interface region R according to the present embodiment is configured as a portion of the anode active layer 112, there is no limitation in this regard. As long as the thickness of the anode active layer 112 may be less than or equal to 3 micrometers, the interface region R may constitute the whole of the anode active layer 112.

It is preferred that the respective content rate of Si, P, Cr, B and S is controlled to the above values in relation to the entire anode active layer 112 and not only the interface region R. That is to say, in the entire anode active layer 112, it is preferred that the content rate of Si is less than or equal to 200 ppm, the content rate of P is less than or equal to 50 ppm, the content rate of Cr is less than or equal to 100 ppm, the content rate of B is less than or equal to 100 ppm, and the content rate of S is less than or equal to 100 ppm. It is still more preferred that in the entire anode active layer 112 the content rate of Si is less than or equal to 100 ppm, the content rate of P is less than or equal to 30 ppm, the content rate of Cr is less than or equal to 50 ppm, the content rate of B is less than or equal to 50 ppm, and the content rate of S is less than or equal to 30 ppm. In the entire anode active layer 112, it is still more preferred that the respective content rate of Si, P, Cr, B and S is greater than or equal to 1 ppm.

The anode active layer 112 has a plurality of pores. The pore ratio in the anode active layer 112 is preferably greater than or equal to 10% and less than or equal to 40% in a state after known reduction processing (for example, a process in which NiO is reduced to Ni in a hydrogen atmosphere at 800 degrees C.). A pore ratio is the surface occupied ratio of all pores that are exposed on the surface relative to the surface area of the anode active layer 112. However, the pore ratio may be the volume occupied ratio of all pores relative to the volume of the anode active layer 112. The microstructure of the anode active layer 112 will be described below.

The solid electrolyte layer 12 is disposed between the anode 11 and the barrier layer 13. The solid electrolyte layer 12 has the function of enabling transmission of oxygen ions generated in the cathode 14. The solid electrolyte layer 12 includes zirconium (Zr). The solid electrolyte layer 12 may include Zr in the form of zirconia (ZrO$_2$). The solid electrolyte layer 12 may include ZrO$_2$ as a main component. In addition to ZrO$_2$, the solid electrolyte layer 12 may include an additive such as Y$_2$O$_3$ and/or Sc$_2$O$_3$. These additives may function as a stabilizer. In the solid electrolyte layer 12, the stabilizer may have a mol composition ratio with respect to the stabilizer ZrO$_2$ (stabilizer: ZrO$_2$) of 3:97-20:80. In other words, the material used in the solid electrolyte layer 12 may include zirconia-based materials such as ScSZ or the like and yttria-stabilized zirconia such as 3YSZ, 8YSZ, and 10YSZ, or the like. The thickness of the solid electrolyte layer 12 may be 3 micrometers to 30 micrometers.

The barrier layer 13 is disposed between the solid electrolyte layer 12 and the cathode 14. The barrier layer 13 has the function of suppressing formation of a high resistive layer between the solid electrolyte layer 12 and the cathode 14. The material used in the barrier layer 13 includes cerium (Ce) and a ceria-based material including a rare earth metal oxide in solid solution in Ce. More specifically, the ceria-based material includes GDC, SDC, or the like. The thickness of the barrier layer 13 may be 3 micrometers to 20 micrometers.

The cathode 14 is disposed on the barrier layer 13. The cathode 14 functions as the cathode of the cell 10. The cathode 14 may contain a perovskite-type complex oxide including lanthanum as a main component. The perovskite-type complex oxide including lanthanum for example includes LSCF (lanthanum strontium cobalt ferrite), lanthanum manganite, lanthanum cobaltite, and lanthanum ferrite. The perovskite-type complex oxide containing lanthanum may be doped with strontium, calcium, chromium, cobalt, iron, nickel, aluminum, and the like. The thickness of the cathode 14 may be 10 micrometers to 100 micrometers.

Microstructure of Anode Active Layer 112

In the following description, the preferred microstructure of the anode active layer 112 will be described making reference to FIG. 2 to FIG. 5 in sequence. The description is based on the premise that the anode 11 is in a reduced state.

(1) SEM Image

Figure 2:
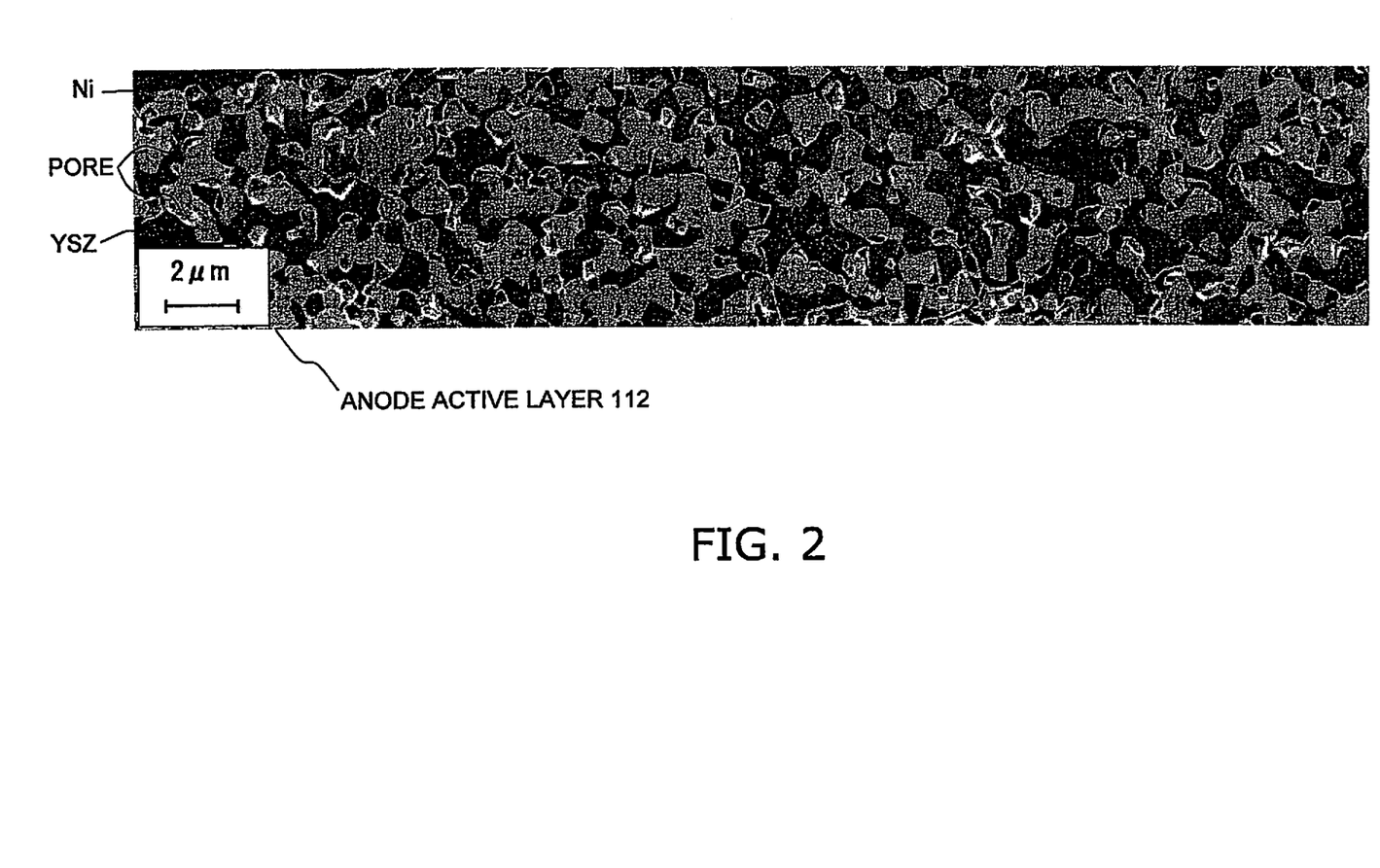
FIG. 2 is a SEM image of the cross section of an anode active layer.

FIG. 2 is a sectional SEM image of the anode active layer 112 enlarged with a magnification of 3000 times by a field emission scanning electron microscope (FE-SEM) using an in-lens secondary electron detector. FIG. 2 illustrates a sectional view of the anode active layer 112 that is composed of Ni-8YSZ. In the sectional view of the anode active layer 112, after polishing with precision machinery, ion milling processing is performed using an IM4000 manufactured by Hitachi High-Technologies Corporation. FIG. 2 is an SEM image obtained by an FE-SEM (model: ULTRA55) manufactured by Zeiss AG (Germany) with a working distance setting of 2 mm, and an acceleration voltage of 1 kV. The size of one field of view as illustrated in FIG. 2 has dimensions of vertical 7 micrometers×horizontal 34 micrometers.

In the SEM images, the contrast enables individual display of Ni particles, 8YSZ particles, and the pores, and in FIG. 2, the Ni particles are displayed with a "white" color, the 8YSZ particles with a "black" color and the pores with a "grey" color. However, in FIG. 2, a portion of the contour of the pores is displayed in whiteout condition.

The method of discriminating the Ni particles, the 8YSZ particles and the pores is not limited to use of contrast in a SEM image. For example, after acquisition of element mapping using SEM-EDS in the same field of view, trivalent values can be obtained for the Ni particles, the 8YSZ particles and the pores by checking against the FE-SEM image (including the in-lens image and the out-lens image) previously obtained by use of the in-lens secondary electron detector to thereby identify respective particles in the SEM image. The identification of each particle is simplified by determining that low-luminance regions on the out-lens image are pores, and then determining that high-luminance regions in a region other than the pores on the in-lens image are Ni particles, and low-luminance regions are 8YSZ particles.

In the present embodiment, an Ni particle is an example of "a transition metal particle" and an 8YSZ particle is an example of an "oxygen ion conductive material particle".

(2) Analysis of SEM Image

Figure 3:
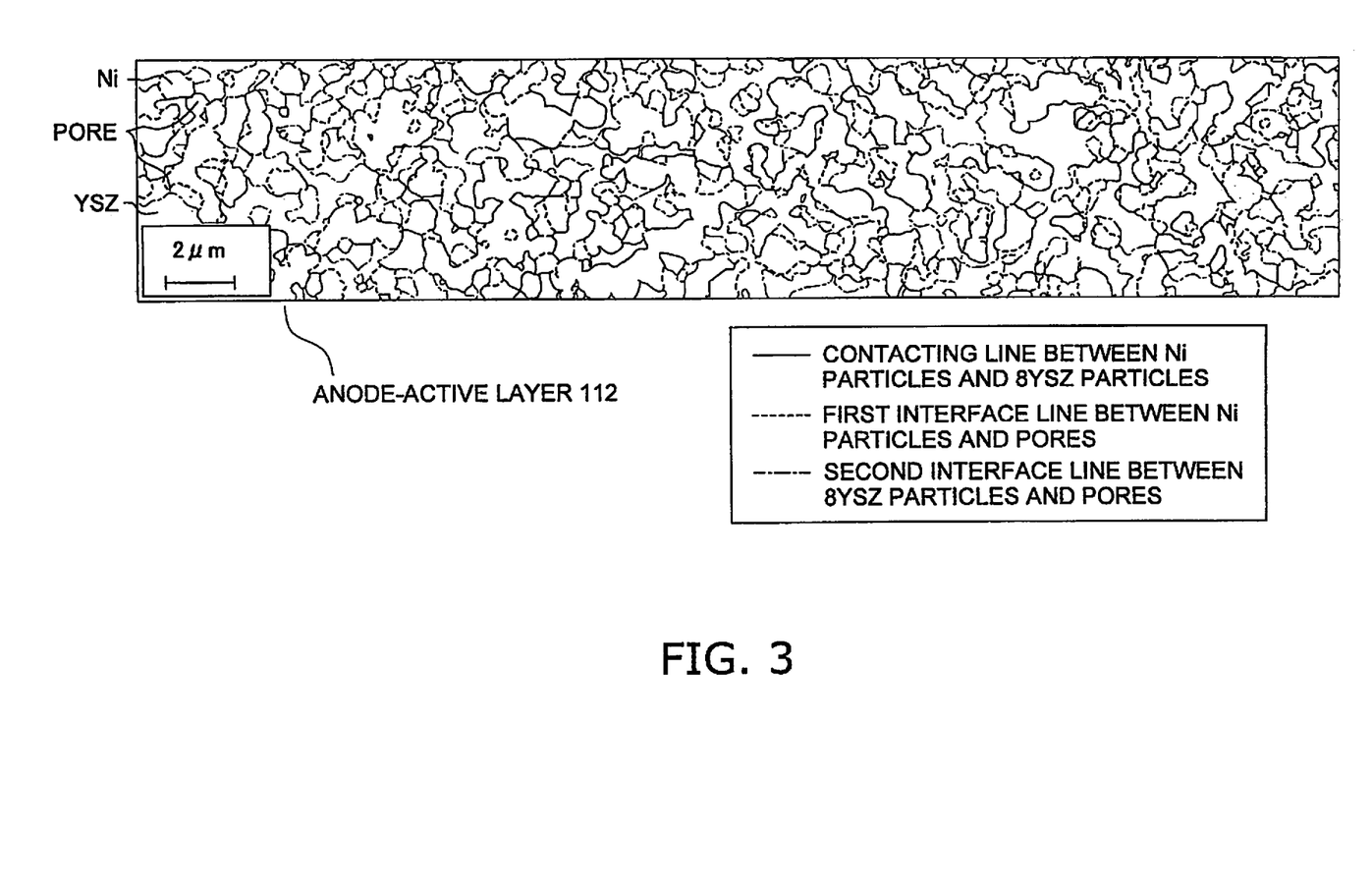
FIG. 3 illustrates the analysis results of the SEM image illustrated in FIG. 2.

FIG. 3 illustrates the image analysis results for the SEM image illustrated in FIG. 2 using HALCON image analysis software produced by MVTec GmbH (Germany). In FIG. 3, the contacting line of the Ni particles and the 8YSZ particles is shown by the solid line, the interface boundary of the Ni particles and the pores (hereinafter referred to as "first interface line") is shown by the broken line, and the interface boundary of the 8YSZ particles and the pores (hereinafter referred to as "second interface line") is shown by the dot-dash line. As illustrated in FIG. 3, in an inner portion of the anode active layer 112, the Ni particles is connected to the 8YSZ particles at a plurality of spots. Furthermore, the Ni particles and the pores are adjacent at a plurality of spots, and the 8YSZ particles and the pores are adjacent at a plurality of spots.

(3) Distribution Graph of Contact Length

Figure 4:
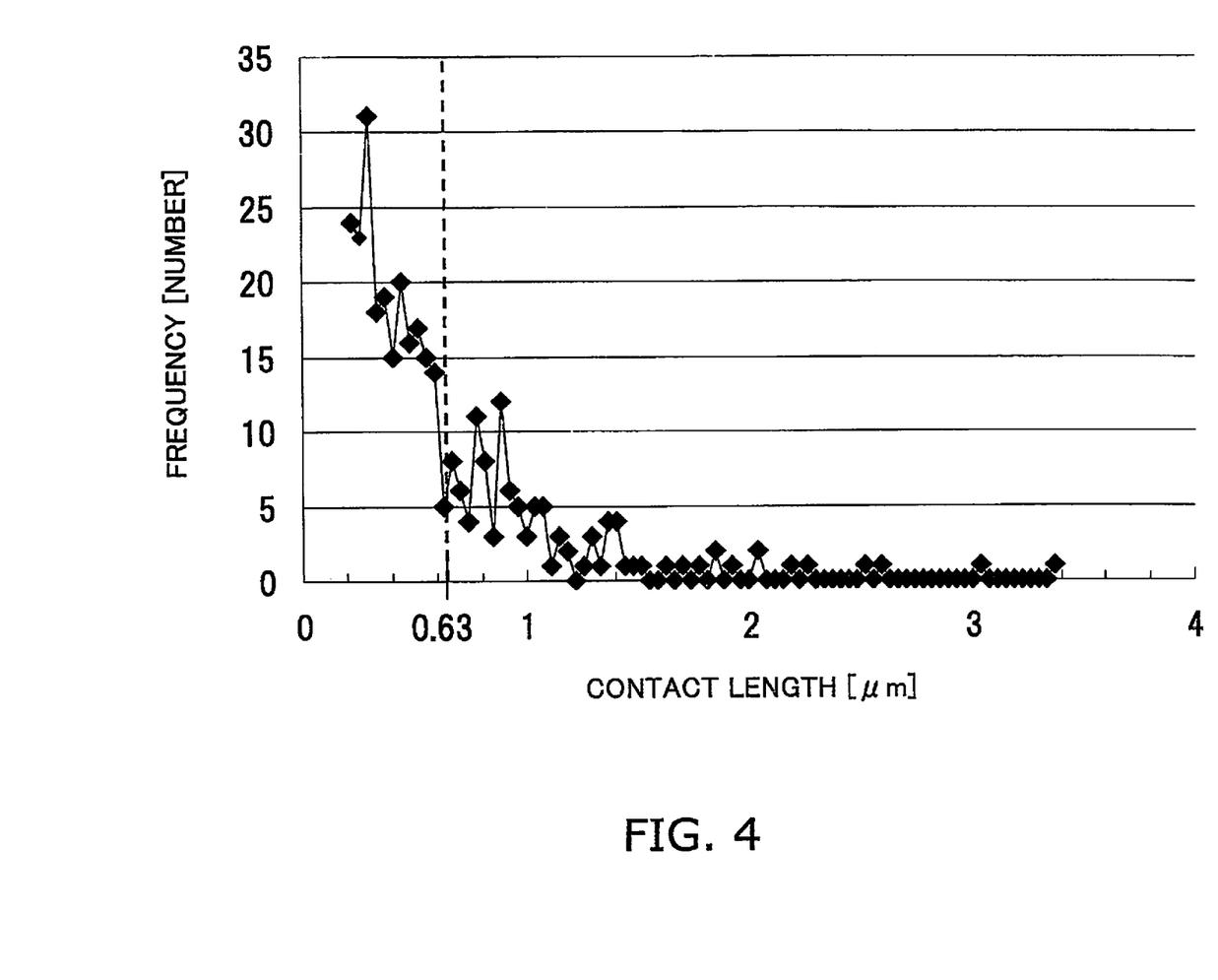
FIG. 4 is a distribution graph illustrating the distribution of the contact length between a Ni particle and 8YSZ particle contact interface.

FIG. 4 is a distribution graph of the contact length of the Ni particles and the 8YSZ particles. The distribution graph is prepared based on the image analysis results for one field of view as illustrated in FIG. 3. In the present embodiment, data for contacting positions of less than or equal to 0.2 micrometers recognized by the image analysis software is not used in relation to the calculation of the average value of the contact length as described below, or in the calculation of the standard deviation of the average value of the contact length. This is due to the fact that confirmation of the presence of a contacting position at 0.2 micrometers or less as recognized by the image analysis software is not possible according to the results of observation at a higher magnification, and therefore the contacting position of 0.2 micrometers or less has been determined to be not suitable for consideration for inclusion as a factor to regulate the output performance, or deterioration of the anode.

The average value of the contact length of the Ni particles and the 8YSZ particles (hereinafter referred to as "average value of contact length") is preferably greater than or equal to 0.4 micrometers and less than or equal to 0.9 micrometers. The average value of the contact length is a value calculated by dividing the sum of the contact lengths of the Ni particles and the 8YSZ particles by the number of contacting spots, and in the example illustrated in FIG. 4, takes a value of 0.63 micrometers. The average value of the contact length may be calculated using the analysis results in one field of view or a plurality of fields of view, and the magnification of the SEM image is not limited to 3000 times.

The average value of the contact length is an index that indicates the bond width of the Ni particles and the 8YSZ particles. A bond that has a sufficient and requisite width between the Ni particles and the 8YSZ particles can be formed by controlling the average value of the contact length to a predetermined range. In this manner, since a strong connected network can be created between the Ni particles and the 8YSZ particles which form the backbone, a variation in the configuration of the Ni particles can be suppressed, and it is possible to preserve the reaction field in the anode active layer 112. As a result, the resistance value of the anode active layer 112 can be reduced and output of the cell 10 can be enhanced.

Control of the grain size distribution of the 8YSZ powder and the NiO powder for example is effective to adjust the average value of the contact length. The average value of the contact length can be micro-adjusted by the firing conditions or the addition amount and average particle diameter of the pore forming agent. In the following description, an example will be given of the preparation conditions for controlling the average value of the contact length to a range of greater than or equal to 0.4 micrometers and less than or equal to 0.9 micrometers as described above.

It is preferred that:
  the average particle diameter of the raw material powder is greater than or equal to 0.5 micrometers and less than or equal to 1.3 micrometers, and that microscopic particles having a particle diameter of less than or equal to 0.2 micrometers are removed by classification processing,
  the average particle diameter of the pore forming agent is greater than or equal to 0.8 micrometers and less than or equal to 10 micrometers,
  the addition amount of the pore forming agent is less than or equal to 20 volume % relative to the ceramic raw material (8YSZ+NiO), and
  the co-firing temperature is at least 1350 degrees C. and no more than 1500 degrees C., and the processing time is at least 1 hour and no more than 20 hours.

The ratio of the number of average contacting spots that have at least the average value of the contact length to the total number of contacting spots between the Ni particles and the 8YSZ particles (hereinafter referred to as "contacting spot ratio exhibiting at least the average value") is preferably greater than or equal to 25.9% and less than or equal to 48.9%. The distribution graph illustrated in FIG. 4 illustrates the contacting spot ratio exhibiting at least the average value corresponding to a ratio of the sum of the frequency of least the average value of 0.63 micrometers relative to the total frequency, and takes a value of 34.0%. The contacting spot ratio exhibiting at least the average value is an index that indicates resistance to configuration change in the Ni particles. That is to say, when the contacting spot ratio exhibiting at least the average value is controlled to within a predetermined range, suppression of configuration change of the Ni particles is enhanced, and the durability of the anode active layer 112 can be enhanced.

In the same manner as adjustment of the average value of the contact length, the grain size distribution of the 8YSZ powder and the NiO powder for example is effective to adjust the contacting spot ratio exhibiting at least the average value. The contacting spot ratio exhibiting at least the average value can also be micro-adjusted by the firing conditions or the method of mixing the materials. In the following description, an example will be given of the preparation conditions for controlling the contacting spot ratio exhibiting at least the average value to a range of greater than or equal to 25.9% and less than or equal to 48.9% as described above.

It is preferred that:
the average particle diameter of the raw material powder (8YSZ, NiO) is greater than or equal to 0.5 micrometers and less than or equal to 1.3 micrometers, and that microscopic particles having a particle diameter of less than or equal to 0.3 micrometers and coarse particles of greater than or equal to 2 micrometers are removed by classification processing,
the material forming the anode active layer (printing paste when formation is performed using a printing method) is uniformly mixed,
when preparing a printing paste as a material for forming the anode active layer, after preparing a slurry having superior dispersing characteristics due to addition of a suitable dispersing agent, the slurry is uniformly mixed by sufficient application of pot-mill mixing and tri-roll mill mixing, and
the firing temperature is at least 1400 degrees C. and no more than 1450 degrees C., and the processing time is at least 5 hours and no more than 10 hours.

The average value of a first interface length (broken line) between the Ni particles and the pores is preferably greater than or equal to 0.2 micrometers and less than or equal to 0.7 micrometers. The average value of the second interface length (broken line) between the YSZ particles and the pores is preferably greater than or equal to 0.5 micrometers and less than or equal to 1.2 micrometers.

(4) Deviation in Contact Length

In an SEM image with arbitrarily captured 10 fields of view (magnification ×3000), the standard deviation of the average value of the contact length of the Ni particles and the 8YSZ particles is preferably less than or equal to 0.48. The standard deviation of the average value of the contact length is an index indicating the bond width of the Ni particles and the 8YSZ particles in the anode active layer 112. That is to say, the uniformity of the conductivity of the inner portion of the anode active layer 112 is enhanced by reducing the standard deviation of the average value of the contact length, and thereby it is possible to suppress concentration and flow of current in a part of the inner portion of the anode active layer 112. In this manner, since acceleration of the deterioration of a part of the inner portion of the anode active layer 112 can be suppressed, the durability of the cell 10 can be further enhanced.

In the same manner as the adjustment of the contacting spot ratio exhibiting at least the average value, the standard deviation of the average value can be adjusted by controlling the average particle diameter of the raw material powder, the mixing conditions of the material forming the anode active layer, and the firing conditions. Furthermore, the standard deviation of the average value can be adjusted by controlling the contamination by impurities into the mixing process. By controlling contamination by impurities in this manner, it is possible to ensure reproducibility and enhance composition control characteristics during co-firing, and to enhance the uniformity of the progress of sintering of the NiO particles and the 8YSZ particles. Therefore, suppression of variation in the contact length by suppressing contamination by impurities is particularly effective in order to control the standard deviation of the average value. More specifically, it is sufficient if the contamination by Si, B, Cr, P, S and the like is approximately less than or equal to 200 ppm.

In an SEM image with arbitrarily captured 10 fields of view (magnification ×3000), the standard deviation of the average value of the first interface length of the Ni particles and the pores is preferably greater than or equal to 0.2 and less than or equal to 0.6. In an SEM image with arbitrarily captured 10 fields of view (magnification ×3000), the standard deviation of the average value of the second interface length of the YSZ particles and the pores is preferably greater than or equal to 0.6 and less than or equal to 1.0.

(5) Ratio of Isolated Ni Particles

Figure 5:
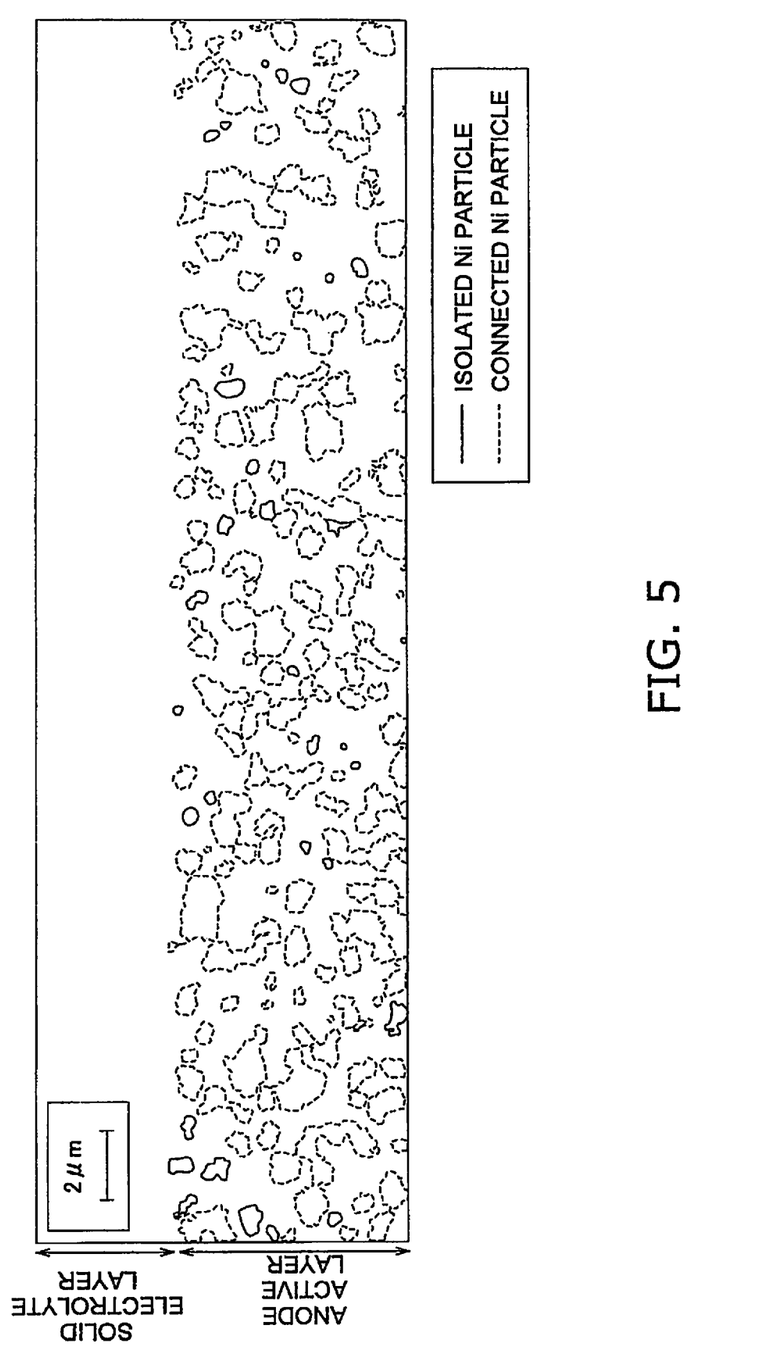
FIG. 5 illustrates the analysis results of connected Ni particles and isolated Ni particles (FE-SEM using an in-lens secondary electron detector).

FIG. 5 is an FE-SEM image using an in-lens secondary electron detector and illustrates the analysis results of connected Ni particles and isolated Ni particles.

The use of the in-lens secondary electron detector enables output of the difference in the conductivity in the respective Ni particles as an image contrast. It is known that particles that have high conductive characteristics, that it to say, that have high connectivity characteristics in relation to which electrical connectivity with the peripheral Ni particles has been confirmed are displayed in a bright configuration, and particles that have low conductive characteristics, that it to say, that have unconfirmed electrical connectivity with the peripheral Ni particles are displayed in a dark configuration (reference is made to "Solid State Ionics" 178(2008)1984).

FIG. 5 is an FE-SEM image using an in-lens secondary electron detector. In order to confirm that the resulting contrast in the Ni particles expresses the difference in the presence or absence of connectivity in the Ni particles, that is to say, expresses the difference in conductivity, a resistance evaluation of the respective Ni particles was performed using an atomic force microscope (AFM) in a single field of view by scanning a cross section with a cantilever to which a predetermined voltage was applied. At this time, the regions configured by Ni particles were classified into conductive regions and non-conductive regions based on the dimension of the current. The results of analysis were used to determine that a conductive region consists of "connected Ni particles" and a non-conductive region consists of "isolated Ni particles". That is to say, a connected Ni particle is an Ni particle that is connected to at least one adjacent Ni particle, and an isolated Ni particle is an Ni particle that is not connected to an adjacent Ni particle, and exists in an singular configuration. In FIG. 5, the isolated Ni particles are encircled with the solid line and the connected Ni particles are encircled with the broken line.

It is preferred that the ratio of the occupied surface area of the isolated Ni particles to the total occupied surface area of the Ni present in one field of view (hereinafter referred to as "isolated Ni particle ratio") is less than or equal to 25%.

The isolated Ni particle ratio is an index of the conductivity of the anode active layer 112. That is to say, as the isolated Ni particle ratio becomes smaller, the reaction resistance of the anode active layer 112 can be decreased, and therefore, maintenance of the output of the cell 10 can be enhanced.

The isolated Ni particle ratio can be controlled for example by adjusting the powder characteristics (particle diameter, specific surface area) of the NiO powder that is mixed into the slurry for use in the anode 11. Furthermore, the adjustment of the isolated Ni particle ratio can be controlled by adjusting the firing temperature and the firing time, or by adjusting the addition amount or the particle diameter of the pore forming agent.

In particular, it is important to use a material with high activity NiO particles. Use of an NiO material with a high specific surface area enhances the contacting characteristics with other NiO or 8YSZ during firing, and reduces the isolated Ni particle ratio even after a reducing process. More specifically, it is preferred to use a material configured from NiO particles that have a specific surface area of 5 $m^2/g$ to 20 $m^2/g$. When using a material with a high specific surface area, addition of an effective dispersing agent (for example, a wetting dispersing agent such as "DESPERBYK®-180" manufactured by BYK-Chemie Japan) must be added. This is due to the fact that, in a slurry with low dispersing characteristics, particles with a high specific surface area form an aggregate, and conversely inhibit sintering characteristics to thereby improve the isolated Ni particle ratio. The firing temperature is preferably as least 1400 degrees C. and less than or equal to 1450 degrees C., and the processing time is preferably at least 5 hours, no more than 10 hours.

When analyzing a SEM image using image analysis software, connected Ni particles and isolated Ni particles can be determined by detailed detection of contrasts. For example, in the region that is uniformly classified as "grey" in FIG. 2, the bright region may be determined to be "connected Ni particles", whereas the dark region may be determined to be "isolated Ni particles".

In the various methods described above relate to the determination of connected Ni particles and isolated Ni particles, the surface area that is obtained by actually cutting using mechanical processing along the thickness direction (direction of stack) of a sample of the cell 10 is analysed. Therefore, it may be considered that some of the Ni particles that are distributed in proximity to the cross section were connected Ni particles prior to cutting and changed to isolated Ni particles after cutting (or vice versa). However, it is considered that the ratio of the particles that changed from connected Ni particles to isolated Ni particles (or vice versa) before and after cutting of the Ni particles distributed in proximity to the cross section is extremely small. Therefore, an isolated Ni particle ratio calculated based on the cross section obtained by cutting a sample of the cell 10 using mechanical processing substantially corresponds with the actual isolated Ni particle ratio prior to cutting a sample of the cell 10.

Method of Manufacturing Fuel Cell 10

Next, an example of a method of manufacture for the cell 10 will be described. Respective conditions such as the material, the particle diameter, the temperature and the method of coating as described below may be varied as required. "Green body" below denotes a state prior to firing. In the following description, as illustrated in FIG. 1, the interface region R is a portion of the anode active layer 112.

Firstly, a transition metal oxide (for example, NiO powder), and an oxygen ion conductive material (for example, 8YSZ powder), and a pore forming agent (for example, PMMA; Poly(methyl methacrylate resin)) are mixed.

Next, a slurry is formed by adding polyvinyl alcohol (PVA) as a binder to a mixture of the transition metal oxide, the oxygen ion conductive material, and the pore forming agent.

Next, the slurry is dried and granulated by use of a spray drier to form a powder for the anode current collecting layer.

Then, the powder for the anode current collecting layer is molded using a die press molding method to form a green body for the anode current collecting layer 111.

Next, the transition metal oxide (for example, NiO powder), and the oxygen ion conductive material (for example, 8YSZ powder), and the pore forming agent (for example, PMMA) are mixed.

Next, a slurry is formed by adding polyvinyl alcohol as a binder to a mixture of the transition metal oxide, the oxygen ion conductive material, and the pore forming agent.

Next, a first-layer of the green body of the anode active layer 112 is formed by printing the slurry onto the green body of the anode active layer 111 using a printing method.

Next, the transition metal oxide (for example, NiO powder), and the oxygen ion conductive material (for example, 8YSZ powder), the additive (Si, P, Cr, B and S), and the pore forming agent are mixed.

Next, a slurry is formed by adding polyvinyl alcohol as a binder to a mixture of the transition metal oxide, the oxygen ion conductive material, the additive, and the pore forming agent.

Next, a second-layer of the green body of the anode active layer 112 is formed by printing the slurry onto the first-layer of the green body using a printing method. With this, the green body of the anode 11 is formed.

When preparing the slurry for the second-layer of the anode active layer 112, after firing and reducing, it is preferred that additives are added so that Si is less than or equal to 200 ppm, the P is less than or equal to 50 ppm, Cr is less than or equal to 100 ppm, B is less than or equal to 100 ppm, and S is less than or equal to 100 ppm. In addition, when preparing the slurry for the first-layer of the anode active layer 112, after firing and reducing, it is also preferred that additives are added in the same manner. The additives are further preferably adjusted so that respectively in the first-layer and the second-layer, Si is less than or equal to 100 ppm, P is less than or equal to 30 ppm, Cr is less than or equal to 50 ppm, B is less than or equal to 50 ppm, and S is less than or equal to 30 ppm. It is further preferred to adjust the respective content rate of Si, P, Cr, B and S to be greater than or equal to 1 ppm.

Next, a mixture of 8YSZ powder, water and a binder is mixed in a ball mill for 24 hours to prepare a slurry. Then the slurry is coated on the green body for the anode 11 and dried to form a green body for the solid electrolyte layer 12. In substitution for a method of coating, a method such as a tape stacking method or a printing method may be used.

Then, a mixture of GDC powder, water and a binder is mixed in a ball mill for 24 hours to prepare a slurry. Then the slurry is coated on the green body for the solid electrolyte layer 12 and dried to form a green body for the barrier layer 13. In substitution for a method of coating, a method such as a tape stacking method or a printing method may be used.

As described above, a stacked body configured from the green body for the anode 11, the green body for the solid electrolyte layer 12 and the green body for the barrier layer 13 can be formed.

Then, the stacked body is co-sintered for 2 to 20 hours at 1300 to 1600 degrees C. to form a co-fired body formed from a dense barrier layer 13, the solid electrolyte layer 12 and the anode 11 that includes the anode current collecting layer 111 and the anode active layer 112.

Then, a mixture of water and a binder is mixed with LSCF powder in a ball mill for 24 hours to prepare a slurry. The slurry is coated on the barrier layer 13 of the co-fired body and dried, and fired for one hour in an electric furnace (oxygen-containing atmosphere, 1000 degrees C.) to form the porous cathode 14 on the barrier layer 13. In this manner, the cell 10 is completed.

Operation and Effect (1) The present inventors conducted diligent research in relation to the problem that the voltage of the cell 10 is reduced during long-term operation, and gained the insight that such a phenomenon results from an increase in the reaction resistance in the interface region R of the anode 11 that is the reaction region between hydrogen and the oxygen ions. More specifically, when sintering a molded body for the anode 11, the reduction in the reaction fields for hydrogen and oxygen ions caused by excessive progress of sintering of the transition metal results in an increase in the reaction resistance in the interface region R.

As a result, the interface region R according to the present embodiment is adjusted so that the content rate of Si is less than or equal to 200 ppm, the content rate of P is less than or equal to 50 ppm, the content rate of Cr is less than or equal to 100 ppm, B is less than or equal to 100 ppm, and the content rate of S is less than or equal to 100 ppm.

Therefore, since it is possible to suppress progress of sintering of the transition metal during sintering of the green body for the anode 11, it is possible to suppress a reduction in the reaction fields between hydrogen and oxygen ions. As a result, the increase in the reaction resistance in the interface region R can be suppressed, and a reduction in the voltage of the cell 10 can be suppressed.

Although the mechanism itself by which suppression of the respective content rate of Si, P, Cr, B and S causes a suppression in the progress of sintering of the transition metal is not always clear, it is thought to result from the effect of a suitable amount of Si, P, Cr, B and S being taken up into an inner portion of the transition metal particles, or into the grain boundary of the transition metal particles.

(2) The content rate respectively of Si, P, Cr, B and S in the anode active layer 112 is greater than or equal to 1 ppm.

Therefore, since Si, P, Cr, B and S function as a sintering auxiliary, suitable sintering characteristics can be maintained in the anode 11 (more specifically, the interface region R). In this manner, since the backbone of the interface region R that has a porous structure can be strengthened, it is possible to stabilize the porous structure during firing and reduction.

Other Embodiments

The present invention is not limited to the above embodiments and various modifications for changes are possible within a scope that does not depart from the spirit of the invention.

(A) In the above embodiment, although the cell 10 includes the anode 11, the solid electrolyte layer 12, the barrier layer 13 and the cathode 14, the invention is not thereby limited. The cell 10 may include the anode 11, the solid electrolyte layer 12 and the cathode 14, and another layer may be interposed between the anode 11 and the solid electrolyte layer 12, or between the barrier 13 and the cathode 14. For example, the cell 10 may include a porous bather layer between the barrier layer 13 and the cathode 14.

(B) Although a vertically striped fuel cell has been described in the above embodiment, the shape of the cell 10 is not limited in this regard, and the shape of the cell 10 may be a segmented-in-series type, an anode-support type, a tabular-shape type, a cylindrical-shape type, or the like. Furthermore, the sectional surface of the cell 10 may be oval, or the like.

(C) In the present embodiment, the anode active layer 112 is configured to include at least NiO and/or Ni as a transition metal. However, the invention is not limited in this regard. The anode active layer 112 may include $Fe_2O_3$ (or FeO) and/or Fe, CuO and/or Cu or the like, in substitution for NiO and/or Ni. The anode active layer 112 may also include a plurality of transition metals (or oxides of the transition metal).

(D) In the present embodiment, Si, P, Cr, B and S are mixed with a transition metal and an oxygen ion conductive material. However, the invention is not limited in this regard. Si, P, Cr, B and S may be mixed with a binder in a mixture of a transition metal and an oxygen ion conductive material.

(E) In the present embodiment, in particular, the description has focused on the characteristic structure of the anode active layer 112. When the anode current collecting layer 111 is composed of the same material (for example, Ni-8YSZ) as the anode active layer 112, the anode 11 may be configured to have a region in which the average value of the contact length in proximity to the interface with the solid electrolyte layer 12 is greater than or equal to 0.4 micrometers and less than or equal to 0.9 micrometers. This is due to the fact that it is possible to obtain the desired effect in at least this region. In this region, as described in the above embodiment, the contacting spot ratio exhibiting at least the average value is preferably greater than or equal to 25.9% and more than 48.9%. Furthermore, it is preferred that the standard deviation of the average value of the contact length of the Ni particles and the 8YSZ particles is less than or equal to 0.48.

EXAMPLES

The examples of a cell according to the present invention are described below. However the present invention is not limited to the examples as described below.

Preparation of Samples No. 1 to No. 45

As described below, Samples No. 1 to No. 45 of an anode-support type cell were prepared in which the anode current collection layer is configured as a support substrate.

Firstly, an anode current collection layer (NiO:8YSZ=50:50 (converted using Ni volume %)) having a thickness of 500 micrometers was formed using a die press molding method.

Next, a slurry was formed by adding polyvinyl alcohol to the mixture of the transition metal oxide, the oxygen ion conductive material, and PMMA. The mixing ratio and the type of oxygen ion conductive material and the transition metal are illustrated in Table 1.

A first-layer green body of the anode active layer having a thickness of 10 micrometers was formed on top of the anode current collecting layer using a printing method.

Next, a slurry was formed by adding polyvinyl alcohol to a mixture of the transition metal oxide, the oxygen ion conductive material, an additive (Si, P, Cr, B and S) and PMMA. The mixing ratio and the type of oxygen ion conductive material and the transition metal were the same as those for the green body for the first-layer as described above. The content rate of the additive (Si, P, Cr, B and S) is shown in Table 1.

A second-layer green body of the anode active layer having a thickness of 10 micrometers was formed on top of the first-layer green body using a printing method. Next, an 8YSZ electrolyte having a thickness of 5 micrometers and a GDC barrier film having a thickness of 5 micrometers were formed in series on the anode active layer (second-layer) to thereby form a stacked body.

The stacked body was then co-sintered for two hours at 1400 degrees C. to obtain a co-fired body. Thereafter, an anode supporting coin cell (phi=15 mm) was completed by forming an LSCF cathode having a thickness of 30 micrometers by firing for two hours at 1000 degrees C. After firing, the thickness of the second-layer of the anode active layer (corresponding to the interface region R illustrated in FIG. 1) was 3 micrometers.

Measurement of Output Density

Samples No. 1 to No. 45 were heated to 750 degrees C. while supplying nitrogen gas to the anode and air to the cathode. When 750 degrees C. is reached, a reduction process was performed for three hours while supplying hydrogen gas to the anode current collecting layer. Thereafter, the voltage drop rate per 1000 hours for each sample was measured as a deterioration rate. The output density was expressed as a value at a temperature of 750 degrees C. and a rated current density of 0.2 A/cm². In Table 1, a sample having a deterioration rate of more than 1.0% is evaluated as x. A sample having a deterioration rate of less than or equal to 1.0% is evaluated as ○. A sample having a deterioration rate of less than or equal to 0.5% is evaluated as ◎.

TABLE 1

| Samples | Anode active layer material | Anode active layer composition (%) | Average value of the contact length (μm) | Standard deviation of the average value of the contact length (ten fields of view) | Output density (mW/cm²) | Evaluation |
|---|---|---|---|---|---|---|
| No. 46 | Ni-SYSZ | 35:65 | 0.36 | 0.65 | 465 | X |
| No. 47 | Ni-SYSZ | 35:65 | 0.4 | 0.58 | 620 | ○ |
| No. 48 | Ni-8YSZ | 35:65 | 0.62 | 0.54 | 612 | ○ |
| No. 49 | Ni-8YSZ | 35:65 | 0.75 | 0.56 | 656 | ○ |
| No. 50 | Ni-8YSZ | 40:60 | 0.42 | 0.45 | 632 | ○ |
| No. 51 | Ni-8YSZ | 40:60 | 0.53 | 0.48 | 645 | ○ |
| No. 52 | Ni-8YSZ | 40:60 | 0.63 | 0.46 | 666 | ○ |
| No. 53 | Ni-8YSZ | 40:60 | 0.85 | 0.43 | 635 | ○ |
| No. 54 | Ni-8YSZ | 45:55 | 0.32 | 0.45 | 531 | X |
| No. 55 | Ni-8YSZ | 45:55 | 0.46 | 0.48 | 645 | ○ |
| No. 56 | Ni-8YSZ | 45:55 | 0.64 | 0.52 | 672 | ○ |
| No. 57 | Ni-8YSZ | 45:55 | 0.78 | 0.48 | 664 | ○ |
| No. 58 | Ni-8YSZ | 45:55 | 0.92 | 0.55 | 480 | X |
| No. 59 | Ni-8YSZ | 50:50 | 0.53 | 0.45 | 610 | ○ |
| No. 60 | Ni-8YSZ | 50:50 | 0.72 | 0.53 | 626 | ○ |
| No. 61 | Ni-8YSZ | 50:50 | 0.86 | 0.49 | 632 | ○ |
| No. 62 | Ni-8YSZ | 55:45 | 0.25 | 0.56 | 430 | X |
| No. 63 | Ni-8YSZ | 55:45 | 0.48 | 0.44 | 642 | ○ |
| No. 64 | Ni-8YSZ | 55:45 | 0.75 | 0.54 | 656 | ○ |
| No. 65 | Ni-8YSZ | 55:45 | 0.90 | 0.48 | 620 | ○ |
| No. 66 | Ni-10YSZ | 35:65 | 0.33 | 0.35 | 444 | X |
| No. 67 | Ni-10YSZ | 35:65 | 0.52 | 0.55 | 630 | ○ |
| No. 68 | Ni-10YSZ | 40:60 | 0.66 | 0.48 | 622 | ○ |
| No. 69 | Ni-10YSZ | 40:60 | 0.92 | 0.42 | 425 | X |
| No. 70 | Ni-10YSZ | 50:50 | 0.65 | 0.35 | 630 | ○ |
| No. 71 | Ni-10YSZ | 50:50 | 0.72 | 0.45 | 620 | ○ |
| No. 72 | Ni—ScSZ | 40:60 | 0.35 | 0.56 | 412 | X |
| No. 73 | Ni—ScSZ | 40:60 | 0.48 | 0.50 | 615 | ○ |
| No. 74 | Ni—ScSZ | 45:55 | 0.55 | 0.45 | 670 | ○ |
| No. 75 | Ni—ScSZ | 45:55 | 0.72 | 0.42 | 645 | ○ |
| No. 76 | Ni—ScSZ | 50:50 | 0.78 | 0.54 | 635 | ○ |
| No. 77 | Ni—ScSZ | 50:50 | 0.30 | 0.25 | 412 | X |
| No. 78 | Ni—Fe-8YSZ | 44:1:55 | 0.33 | 0.55 | 428 | X |
| No. 79 | Ni—Fe-8YSZ | 44:1:55 | 0.42 | 0.35 | 625 | ○ |
| No. 80 | Ni—Fe-8YSZ | 42:3:55 | 0.55 | 0.48 | 633 | ○ |
| No. 81 | Ni—Fe-8YSZ | 41:5:55 | 0.66 | 0.62 | 635 | ○ |
| No. 82 | Ni—Fe-8YSZ | 48:2:50 | 0.71 | 0.55 | 633 | ○ |
| No. 83 | Ni—Fe-8YSZ | 45:5:50 | 0.95 | 0.55 | 412 | X |
| No. 84 | Ni—Cu-8YSZ | 44:1:55 | 0.36 | 0.35 | 422 | X |
| No. 85 | Ni—Cu-8YSZ | 43:2:55 | 0.55 | 0.45 | 612 | ○ |
| No. 86 | Ni—Cu-8YSZ | 42:3:55 | 0.65 | 0.52 | 635 | ○ |
| No. 87 | Ni—Cu-8YSZ | 44:1:55 | 0.96 | 0.52 | 405 | X |
| No. 88 | Ni-GDC | 40:60 | 0.35 | 0.25 | 433 | X |
| No. 89 | Ni-GDC | 40:60 | 0.45 | 0.52 | 635 | ○ |
| No. 90 | Ni-GDC | 45:55 | 0.65 | 0.35 | 655 | ○ |
| No. 91 | Ni-GDC | 45:55 | 0.75 | 0.36 | 666 | ○ |
| No. 92 | Ni-GDC | 45:55 | 0.95 | 0.44 | 412 | X |

As illustrated in Table 1, it can be confirmed that the deterioration rate of the cell (that is to say, the voltage drop rate) can be improved when, in the second-layer (interface region R) of the anode active layer, the content rate of Si is less than or equal to 200 ppm, the content rate of P is less than or equal to 50 ppm, the content rate of Cr is less than or equal to 100 ppm, the content rate of B is less than or equal to 100 ppm, and the content rate of S is less than or equal to 100 ppm.

As illustrated in Table 1, it can be confirmed that the deterioration rate of the cell (that is to say, the voltage drop rate) can be further improved when, in the second-layer (interface region R) of the anode active layer, the content rate of Si is less than or equal to 100 ppm, the content rate of P is less than or equal to 30 ppm, the content rate of Cr is less than or equal to 50 ppm, the content rate of B is less than or equal to 50 ppm, and the content rate of S is less than or equal to 30 ppm.

The results are obtained since it is possible to suppress a reduction in the reaction fields for hydrogen and oxygen ions by suppressing progress of sintering of the transition metal during sintering of the green body for the second-layer of the anode active layer.

In Sample No. 45, it is considered that when the mixed amount of the mixture is less than 1 ppm, the strength of the backbone during firing of the anode is insufficient, and sintering progress and causes occurrence of particle growth of Ni particles after reduction.

Preparation of Samples No. 46 to No. 94

As described below, Samples No. 46 to No. 94 of an anode support cell were prepared in which the anode current collection layer was configured as a support substrate.

Firstly, an anode current collection layer (NiO:8YSZ=50:50 (converted using Ni volume %)) having a thickness of 500 micrometers was formed using a die press molding method, and an anode active layer having a thickness of 20 micrometers was formed thereon using a printing method. In Samples No. 46 to No. 65, a raw material for the anode active layer was composed of Ni as the transition metal and 8YSZ as the oxygen ion conductive material. In Samples No. 66 to No. 71, a raw material for the anode active layer was composed of Ni as the transition metal and 10YSZ as the oxygen ion conductive material. In Samples No. 72 to No. 77, a raw material for the anode active layer was composed of Ni as the transition metal and ScSZ as the oxygen ion conductive material. In Samples No. 78 to No. 83, a raw material for the anode active layer was composed of Ni and Fe as the transition metal and 8YSZ as the oxygen ion conductive material. In Samples No. 84 to No. 87, a raw material for the anode active layer was composed of Ni and Cu as the transition metal and 8YSZ as the oxygen ion conductive material. In Samples No. 88 to No. 92, a raw material for the anode active layer was composed of Ni as the transition metal and GDC as the oxygen ion conductive material. The mixing ratio of the transition metal and the oxygen ion conductive material (transition metal:oxygen ion conductive material) was shown in Table 2.

In Samples No. 93 to No. 94, a raw material for the anode active layer was composed of Ni as the transition metal and 8YSZ as the oxygen ion conductive material. The mixing ratio of the transition metal and the oxygen ion conductive material in Sample No. 93 was 40:60, and in Sample No. 94, the mixing ratio of the transition metal and the oxygen ion conductive material was 45:55.

The average value of the contact length in the anode active layer, the contacting spot ratio exhibiting at least the average value, the standard deviation of the average value of the contact length, and the isolated Ni particle ratio were varied as illustrated in Table 2 and Table 3 by adjusting the powder characteristics (particle diameter, specific surface area) of the NiO powder, the addition amount of the pore forming agent, and the particle distribution of 8YSZ in the formation process of the anode active layer.

Next, an 8YSZ electrolyte having a thickness of 5 micrometers and a GDC barrier film having a thickness of 5 micrometers were formed in series on the anode active layer to thereby form a stacked body.

The stacked body was then co-sintered for two hours at 1400 degrees C. to obtain a co-fired body. Thereafter, an anode supporting coin cell (phi=15 mm) for Sample No. 46 to No. 94 was prepared by forming an LSCF cathode having a thickness of 30 micrometers by firing for two hours at 1000 degrees C.

Observation of Sectional Surface of Anode Active Layer

The sectional surface of the anode active layer was observed in Samples No. 46 to No. 94.

More specifically, firstly, after polishing the anode active layer of each sample with precision machinery, ion milling processing was performed using an IM4000 manufactured by Hitachi High-Technologies Corporation.

Then, an SEM image of the sectional surface of the anode active layer enlarged by 3000 times was obtained by use of an FE-SEM using an in-lens secondary electron detector (reference is made to FIG. 2).

Then, the contacting line between the Ni particles and the oxygen ion conductive material was examined by analysis of the sectional photograph illustrated in FIG. 2 using HAL-CON image analysis software produced by MVTec GmbH (Germany) (reference is made to FIG. 3).

Next, the analysis results by the image analysis software were used to calculate the average value of the contact length, the contacting spot ratio exhibiting at least the average value and the isolated Ni particle ratio with respect to a SEM image for one field of view. Furthermore, the analysis results by the image analysis software were used to calculate the standard deviation of the average value of the contact length with respect to a SEM image for ten arbitrary fields of view. The calculation results are shown in Table 2 and Table 3.

Measurement of Output Density

Samples No. 46 to No. 94 were heated to 750 degrees C. while supplying nitrogen gas to the anode and air to the cathode. When 750 degrees C. is reached, a reduction process was performed for three hours while supplying hydrogen gas to the anode. Thereafter, the output density of the Samples No. 46 to No. 94 was measured. The output density is expressed as a value at a temperature of 750 degrees C. and a rated voltage of 0.8 V.

The measurement results are summarized in Table 2. As illustrated in Table 2, the output density is evaluated as a high output when taking a value of at least 600 mW/cm$^2$. As clearly shown by Table 2, it is determined that the average value of the contact length is greater than or equal to 0.4 micrometers and less than or equal to 0.9 micrometers. This is due to the fact that the bond width of the Ni particles and the oxygen ion conductive material can be sufficiently maintained when the average value of the contact length is greater than or equal to 0.4 micrometers, and a sufficient electrochemical reaction region can be maintained after reduction when the average value of the contact length is less than or equal to 0.9 micrometers.

The above results are obtained by ensuring a sufficient bond width between the Ni particles and the oxygen ion conductive material and do not depend on the type of oxygen ion conductive material. Furthermore, the same effect can be obtained even when Fe or Cu is included in addition to Ni as the transition metal.

TABLE 2

| Samples | Anode active layer material | Anode active layer composition (%) | Average value of the contact length (μm) | Standard deviation of the average value of the contact length (ten fields of view) | Output density (mW/cm$^2$) | Evaluation |
|---|---|---|---|---|---|---|
| No. 46 | Ni-8YSZ | 35:65 | 0.36 | 0.65 | 465 | X |
| No. 47 | Ni-8YSZ | 35:65 | 0.4 | 0.58 | 620 | ○ |
| No. 48 | Ni-8YSZ | 35:65 | 0.62 | 0.54 | 612 | ○ |
| No. 49 | Ni-8YSZ | 35:65 | 0.75 | 0.56 | 656 | ○ |
| No. 50 | Ni-8YSZ | 40:60 | 0.42 | 0.45 | 632 | ○ |
| No. 51 | Ni-8YSZ | 40:60 | 0.53 | 0.48 | 645 | ○ |
| No. 52 | Ni-8YSZ | 40:60 | 0.63 | 0.46 | 666 | ○ |
| No. 53 | Ni-8YSZ | 40:60 | 0.85 | 0.43 | 635 | ○ |
| No. 54 | Ni-8YSZ | 45:55 | 0.32 | 0.45 | 531 | X |
| No. 55 | Ni-8YSZ | 45:55 | 0.46 | 0.48 | 645 | ○ |
| No. 56 | Ni-8YSZ | 45:55 | 0.64 | 0.52 | 672 | ○ |
| No. 57 | Ni-8YSZ | 45:55 | 0.78 | 0.48 | 664 | ○ |
| No. 58 | Ni-8YSZ | 45:55 | 0.92 | 0.55 | 480 | X |
| No. 59 | Ni-8YSZ | 50:50 | 0.53 | 0.45 | 610 | ○ |
| No. 60 | Ni-8YSZ | 50:50 | 0.72 | 0.53 | 626 | ○ |
| No. 61 | Ni-8YSZ | 50:50 | 0.86 | 0.49 | 632 | ○ |
| No. 62 | Ni-8YSZ | 55:45 | 0.25 | 0.56 | 430 | X |
| No. 63 | Ni-8YSZ | 55:45 | 0.48 | 0.44 | 642 | ○ |
| No. 64 | Ni-8YSZ | 55:45 | 0.75 | 0.54 | 656 | ○ |
| No. 65 | Ni-8YSZ | 55:45 | 0.90 | 0.48 | 620 | ○ |
| No. 66 | Ni-10YSZ | 35:65 | 0.33 | 0.35 | 444 | X |
| No. 67 | Ni-10YSZ | 35:65 | 0.52 | 0.55 | 630 | ○ |
| No. 68 | Ni-10YSZ | 40:60 | 0.66 | 0.48 | 622 | ○ |
| No. 69 | Ni-10YSZ | 40:60 | 0.92 | 0.42 | 425 | X |
| No. 70 | Ni-10YSZ | 50:50 | 0.65 | 0.35 | 630 | ○ |
| No. 71 | Ni-10YSZ | 50:50 | 0.72 | 0.45 | 620 | ○ |
| No. 72 | Ni—ScSZ | 40:60 | 0.35 | 0.56 | 412 | X |
| No. 73 | Ni—ScSZ | 40:60 | 0.48 | 0.50 | 615 | ○ |
| No. 74 | Ni—ScSZ | 45:55 | 0.55 | 0.45 | 670 | ○ |
| No. 75 | Ni—ScSZ | 45:55 | 0.72 | 0.42 | 645 | ○ |
| No. 76 | Ni—ScSZ | 50:50 | 0.78 | 0.54 | 635 | ○ |
| No. 77 | Ni—ScSZ | 50:50 | 0.30 | 0.25 | 412 | X |
| No. 78 | Ni—Fe-8YSZ | 44:1:55 | 0.33 | 0.55 | 428 | X |
| No. 79 | Ni—Fe-8YSZ | 44:1:55 | 0.42 | 0.35 | 625 | ○ |
| No. 80 | Ni—Fe-8YSZ | 42:3:55 | 0.55 | 0.48 | 633 | ○ |
| No. 81 | Ni—Fe-8YSZ | 41:5:55 | 0.66 | 0.62 | 635 | ○ |
| No. 82 | Ni—Fe-8YSZ | 48:2:50 | 0.71 | 0.55 | 633 | ○ |
| No. 83 | Ni—Fe-8YSZ | 45:5:50 | 0.95 | 0.55 | 412 | X |
| No. 84 | Ni—Cu-8YSZ | 44:1:55 | 0.36 | 0.35 | 422 | X |
| No. 85 | Ni—Cu-8YSZ | 43:2:55 | 0.55 | 0.45 | 612 | ○ |
| No. 86 | Ni—Cu-8YSZ | 42:3:55 | 0.65 | 0.52 | 635 | ○ |
| No. 87 | Ni—Cu-8YSZ | 44:1:55 | 0.96 | 0.52 | 405 | X |
| No. 88 | Ni-GDC | 40:60 | 0.35 | 0.25 | 433 | X |
| No. 89 | Ni-GDC | 40:60 | 0.45 | 0.52 | 635 | ○ |
| No. 90 | Ni-GDC | 45:55 | 0.65 | 0.35 | 655 | ○ |
| No. 91 | Ni-GDC | 45:55 | 0.75 | 0.36 | 666 | ○ |
| No. 92 | Ni-GDC | 45:55 | 0.95 | 0.44 | 412 | X |

Durability Experiment 1

Each of the 12 types samples illustrated in Table 3 was heated to 750 degrees C. while supplying nitrogen gas to the anode and air to the cathode. When 750 degrees C. is reached, a reduction process was performed for three hours while supplying hydrogen gas to the anode current collecting layer. Thereafter, the voltage drop rate per 1000 hours for each sample was measured as a deterioration rate. The output density was expressed as a value at a temperature of 750 degrees C. and a rated current density of 0.35 A/cm$^2$.

The measurement results are summarized in Table 3. As illustrated in Table 3, a low deterioration state is evaluated when the deterioration rate is less than or equal to 1.5%.

As clearly shown in Table 3, it is determined that the contacting spot ratio exhibiting at least the average value is preferably greater than or equal to 25.9% and more than 48.9%. This is due to the fact that a configuration change to the Ni particles is inhibited when the contacting spot ratio is greater than or equal to 25.9%, and a sufficient electrochemical reaction region can be maintained to thereby an excessive over-voltage increase can be suppressed when the contacting spot ratio is less than or equal to 48.9%.

As clearly shown in Table 3, it is determined that the isolated Ni particle ratio is preferably less than or equal to 25%. This is due to the fact that the reaction resistance of the anode active layer can be reduced to thereby facilitate output maintenance when the isolated Ni particle ratio is less than or equal to 25%.

In Sample No. 58 in Table 3, notwithstanding the fact that the isolated Ni particle ratio takes a suitable value of 8.5%, it was not possible to obtain an enhanced effect similar to the other samples since the average value of the contact length exhibited an excessively large value of 0.92. This fact shows that the deterioration rate tends to be rate limited by the average value of the contact length more than by the isolated Ni particle ratio.

As clearly shown by Table 3, it is determined that the standard deviation of the average value of the contact length is preferably less than or equal to 0.48. This is due to the fact that the uniformity of the conductivity in the anode active layer is increased and thereby concentration and flow of current in a part of the anode active layer can be suppressed.

In Sample No. 54 in Table 2, notwithstanding the fact that the standard deviation of the average value of the contact length takes a suitable value of 0.45, it was not possible to obtain an enhanced effect since the average value of the contact length exhibits an excessively small value of 0.32. The fact shows that the output density tends to be rate limited by the average value of the contact length more than by the standard deviation of the average value.

TABLE 3

| Samples | Average value of the contact length (μm) | Contacting spot ratio exhibiting at least the average value (%) | Isolated Ni particles ratio (%) | Standard deviation of the average value of the contact length (ten fields of view) | Deterioration rate (%) | Evaluation |
|---|---|---|---|---|---|---|
| No. 46 | 0.36 | 52.1 | 33 | 0.65 | 2.30 | X |
| No. 50 | 0.42 | 42.3 | 25 | 0.45 | 0.92 | ◎ |
| No. 57 | 0.78 | 33.8 | 8 | 0.48 | 0.32 | ◎ |
| No. 58 | 0.92 | 22.2 | 8.5 | 0.55 | 1.45 | ○ |
| No. 65 | 0.90 | 25.9 | 12 | 0.48 | 0.65 | ◎ |
| No. 68 | 0.66 | 33.3 | 4.5 | 0.48 | 0.35 | ◎ |
| No. 70 | 0.65 | 29.1 | 9.0 | 0.35 | 1.10 | ◎ |
| No. 74 | 0.55 | 38.9 | 15 | 0.45 | 0.75 | ◎ |
| No. 79 | 0.42 | 44.4 | 10 | 0.35 | 0.71 | ◎ |
| No. 91 | 0.75 | 26.5 | 22 | 0.36 | 0.90 | ◎ |
| No. 93 | 0.46 | 48.9 | 18 | 0.42 | 0.85 | ◎ |
| No. 94 | 0.72 | 38.9 | 6.0 | 0.33 | 0.42 | ◎ |

Durability Experiment 2

In order to examine the relationship between the deterioration rate and the concentration of the mixture in the anode active layer, Sample No. 52 that exhibited a suitable output density was used as a reference to thereby prepare Samples No. 52-1-52-5 by adjusting the mixing amount of the mixture as illustrated in Table 4. The mixture is of silicon (Si), phosphorus (P), chrome (Cr), boron (B) and sulfur (S). The mixture may be premixed into the raw material for the anode active layer, or may be mixed during the preparation process.

In the same manner as the durability experiment 1 described above, each of Samples No. 52-1-52-5 was heated to 750 degrees C. while supplying nitrogen gas to the anode and air to the cathode. When 750 degrees C. is reached, a reduction process was performed for three hours while supplying hydrogen gas to the anode. Thereafter, the voltage drop rate per 1000 hours for each sample was measured as a deterioration rate. The output density was expressed as a value at a temperature of 750 degrees C. and a rated current density of 0.35 A/cm$^2$.

TABLE 4

| Samples | Additives (ppm) | | | | | Deterioration rate (%) | Evaluation |
| | Si | P | Cr | B | S | | |
|---|---|---|---|---|---|---|---|
| 52-1 | 250 | 65 | 125 | 30 | 115 | 1.8 | Δ |
| 52-2 | 200 | 50 | 100 | 100 | 100 | 0.88 | ○ |
| 52-3 | 135 | 40 | 70 | 80 | 60 | 0.76 | ○ |
| 52-4 | 100 | 30 | 50 | 50 | 30 | 0.46 | ◎ |
| 52-5 | 50 | 10 | 20 | 20 | 10 | 0.25 | ◎ |

As illustrated in Table 4, it is confirmed that the deterioration rate can be improved when the content rate in the entire anode active layer of Si is less than or equal to 200 ppm, of P is less than or equal to 50 ppm, of Cr is less than or equal to 100 ppm, of B is less than or equal to 100 ppm, and of S is less than or equal to 100 ppm.

As illustrated in Table 4, it is confirmed that the deterioration rate can be further improved when the content rate of Si is less than or equal to 100 ppm, of P is less than or equal to 30 ppm, of Cr is less than or equal to 50 ppm, of B is less than or equal to 50 ppm, and of S is less than or equal to 30 ppm.

The above results are obtained due to stabilization of the porous structure during reduction and during firing due to the mixture of Si, P, Cr, B and S. More specifically, the sintering characteristics of the anode active layer are enhanced by mixing of the mixed materials, and thereby the backbone of the anode active layer that forms the porous body can be strengthened. On the other hand, control of the mixture amount of the mixed materials to a micro-level enables suppression of sintering of Ni during long-term operation, and enables suppression in the reaction fields in the anode active layer.

The improvement in the deterioration rate due to mixing of respectively Si, P, Cr, B and S by greater than or equal to 1 ppm was also confirmed experimentally.

What is claimed is:
1. A fuel cell comprising:
   an anode including transition metal particles and an oxygen ion conductive material;
   a cathode; and
   a solid electrolyte layer disposed between the anode and the cathode;
   the anode after reduction having an interface region within 3 micrometers from the interface between the solid electrolyte layer and the anode,
   the anode having an active anode layer with a volume ratio of Ni and NiO that is 25 to 50 volume % and the volume ratio of the oxygen ion conductive material that is 50 to 75 volume %,
   in the interface region, a content rate of silicon being less than or equal to 200 ppm and greater than 1 ppm, a content rate of phosphorus being less than or equal to 50 ppm and greater than 1 ppm, a content rate of chromium being less than or equal to 100 ppm and greater than 1 ppm, a content rate of boron being less than or equal to 100 ppm and greater than 1 ppm, and a content rate of sulfur being less than or equal to 100 ppm and greater than 1 ppm, and
   the content rates of silicon, phosphorus, chromium, boron and sulfur being present in an inner portion of the transition metal particles or in a particle interface between the transition metal particles.

2. The fuel cell according to claim 1, wherein in the interface region, the content rate of silicon is less than or equal to 100 ppm and greater than 1 ppm, the content rate of phosphorus is less than or equal to 30 ppm and greater than 1 ppm, the content rate of chromium is less than or equal to 50 ppm and greater than 1 ppm, the content rate of boron is less than or equal to 50 ppm and greater than 1 ppm, and the content rate of sulfur is less than or equal to 30 ppm and greater than 1 ppm.

3. The fuel cell according to claim 1, wherein
in the interface region, the content rate of each silicon, phosphorus, chromium, boron and sulfur is greater than or equal to 1 ppm.

4. The fuel cell according to claim 1, wherein
the transition metal particles comprise nickel.

5. The fuel cell according to claim 1, wherein
the oxygen ion conductive material is yttria-stabilized zirconia.

* * * * *